July 6, 1965
R. C. MERCER
3,193,840
APPARATUS FOR LIQUID IMMERSION MOTION
PICTURE FILM PROJECTION
Filed Oct. 27, 1961
3 Sheets-Sheet 1
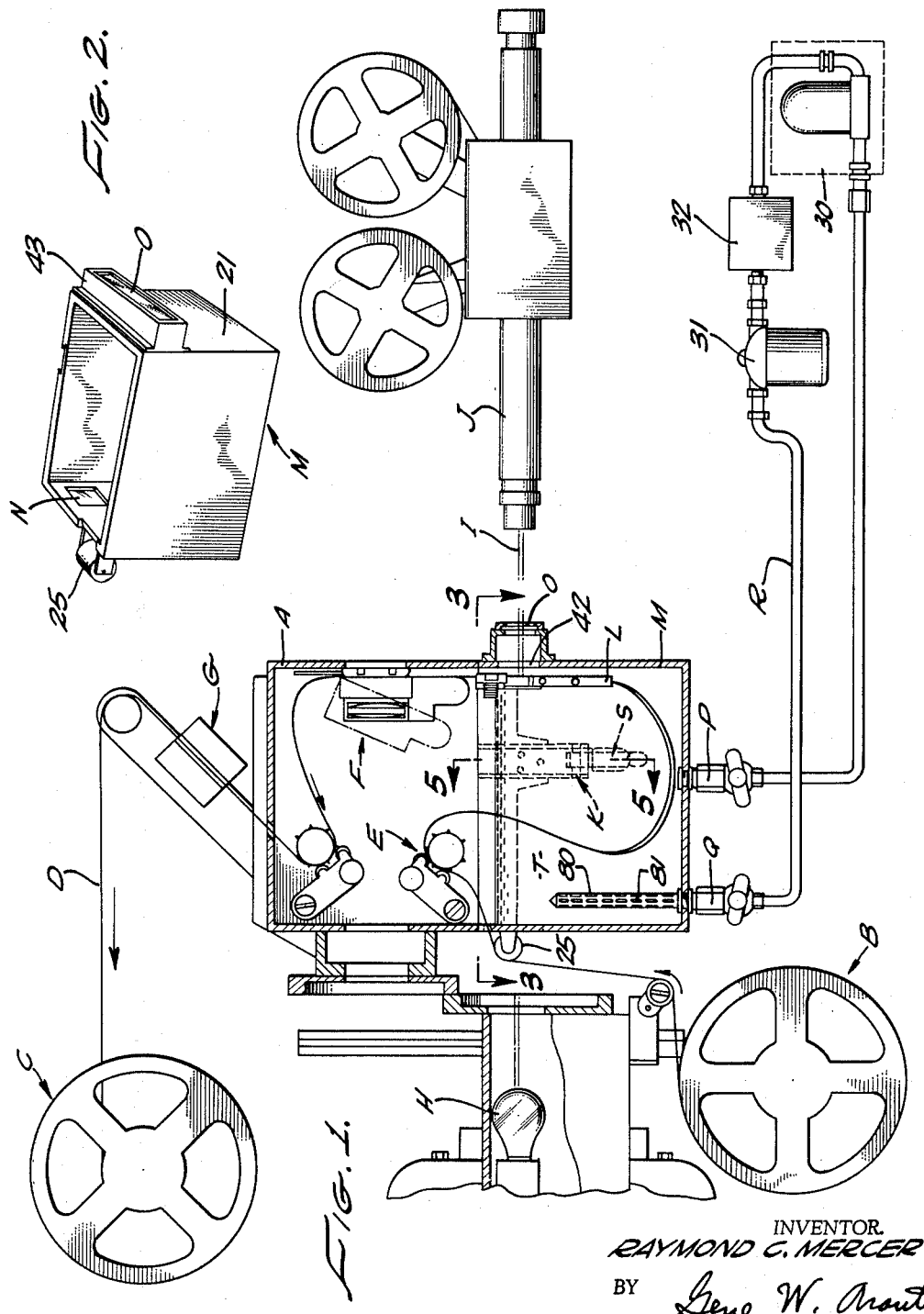
INVENTOR.
RAYMOND C. MERCER
BY Gene W. Grant
ATTORNEY July 6, 1965

R. C. MERCER 3,193,840

APPARATUS FOR LIQUID IMMERSION MOTION
PICTURE FILM PROJECTION

Filed Oct. 27, 1961

INVENTOR.
RAYMOND C. MERCER
BY
Gene W. Arant
ATTORNEY

July 6, 1965

R. C. MERCER 3,193,840

APPARATUS FOR LIQUID IMMERSION MOTION
PICTURE FILM PROJECTION

Filed Oct. 27, 1961

INVENTOR.
RAYMOND C. MERCER
BY
Gene W. Arant
ATTORNEY

3,193,840
APPARATUS FOR LIQUID IMMERSION MOTION PICTURE FILM PROJECTION
Raymond C. Mercer, 4338 Burns Ave., Hollywood, Calif.
Filed Oct. 27, 1961, Ser. No. 148,067
4 Claims. (Cl. 352—130)

The present invention relates to an apparatus for projecting a motion picture film while immersed in a liquid having an index of refraction approximately identical to that of the film.

The term "projection" in the present application is used in a generic sense, as including both optical printing and the projection of a picture onto a screen.

The use of liquid-immersion techniques in optical printing has been known for some time, and is described in recent articles in the Journal of the Society of Motion Picture and Television Engineers. One such article by John R. Turner and others was published in October 1957 and another such article by Donald A. Delwiche and others in October 1958.

Liquid-immersion techniques as heretofore used in optical printing have not produced altogether satisfactory results, from a photographic standpoint, and have also involved the use of cumbersome and unreliable apparatus.

There has been a definite need for correction of optical defects in the projection of motion picture film onto a screen, but the liquid-immersion apparatus and techniques as heretofore known have been incapable of being extended to this application.

One object of the invention, therefore, is to provide an apparatus for liquid-immersion projection of motion picture film, which eliminates the effects of optical defects in the film to a greater extent than has heretofore been possible.

Another object of the invention is to provide such an apparatus which is highly reliable in operation and easily carried out by the average technician.

A further object of the invention is to provide an apparatus for liquid-immersion projection of motion picture film onto a screen, which involves a minimum amount of modification of standard types of projection equipment.

An additional object of the invention is to provide an apparatus for liquid-immersion motion picture film projection in which the same liquid is used both for optical correction of film defects and for cooling purposes to carry away the heat energy developed by the projection light source.

In projecting film onto a screen it is necessary to use a high-energy light source within the projector. The light beam thus developed is focused into a path of small cross-sectional area at the point where it passes through the film. As a result of the high-intensity light beam passing through the film a considerable amount of heat is continuously generated within the film, thus tending to raise the temperature of the film substantially higher than the ambient temperature. It is a commonplace occurrence for the film to become damaged as a result of becoming overheated, and more specifically, the film tends to warp thus making a correct focus impossible.

Even when motion picture film is successfully operated within its temperature limits, the size and clarity of the picture projected onto the screen must be limited in accordance with the amount of light energy passing through the film. It would, therefore, be advantageous to be able to pass a higher amount of light energy through a motion picture film without raising the temperature of the film above its permissible upper limit.

The present invention is based upon a recognition of the fact that the heat dissipation problem and the optical correction problem involved in projecting onto a screen can be solved simultaneously, by the use of a single body of liquid in which the film is completely immersed at the point where the light beam passes through it. Thus, the primary object of the present invention is to provide a method and an apparatus which accomplish both of these purposes simultaneously.

The objects and advantages of the invention will be more fully understood from the following description considered in conjunction with the accompanying drawings, in which:

FIGURE 1 is a side elevational view, partially in cross-section, of one form of the invention;

FIGURE 2 is a perspective view of the liquid tank of FIGURE 1;

FIGURE 7 is an elevational view taken on the line 7—7 of FIGURE 5;

Figure 3:
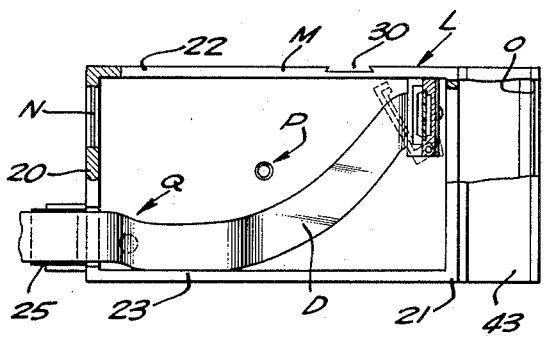
FIGURE 3 is a top plan view, partially in cross-section, of the liquid tank taken along the line 3—3 of FIGURE 1.

Referring now to the drawings, and particularly to FIGURE 1 thereof, the projection apparatus is seen to include a housing A having associated therewith a supply reel B and a takeup reel C, together with other suitable mechanism for providing longitudinal movement of the film strip D. A liquid tank M is removably attached to the under side of housing A, and a first drive means E located within the housing A operates to continuously lower the film strip D into the liquid tank while a second drive means F also located within the housing operates to continuously raise the film strip upward out of the liquid tank M.

Figure 13:
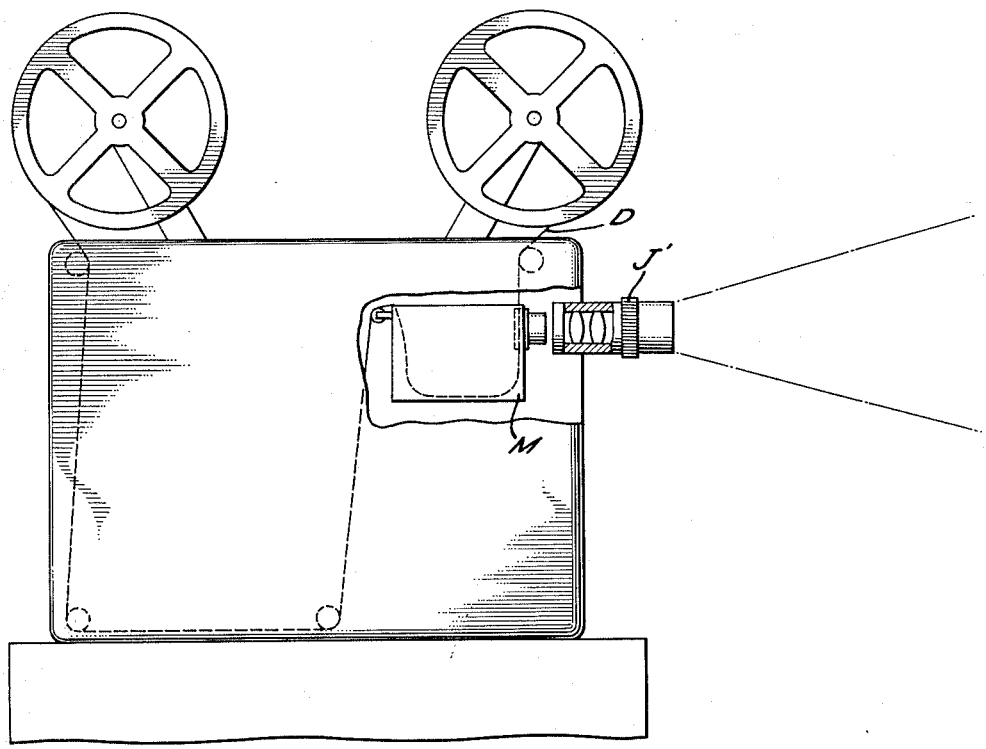
FIGURE 13 is an elevational view, partially schematic, of an alternate form of the invention.

Below and to the left of housing A there is a light source H, which generates a light beam I that passes horizontally beneath the housing A, through windows in the end walls of tank M, and hence to a picture-receiving element J located below and to the right of the housing A. In the embodiment of the invention illustrated in FIGURE 1 the picture-receiving element J is the objective lens of a camera used as a film recopier. In the alternate form of the invention illustrated in FIGURE 13 the corresponding picture-receiving element J' is a projection lens having a diverging focus suitable for projecting the picture onto a screen.

As may best be seen in FIGURES 2 and 3, the tank M has a first window N formed in its left-hand end wall 20 (as seen in FIGURE 1) and a second window O formed in its right-hand end wall 21 (as seen in FIGURE 1). Tank M is filled with a body of liquid T having an index of refraction substantially identical to that of the film strip D, and the level of the liquid is such as to cover the windows N and O. The two windows are parallel to each other and in aligned relationship such that the light beam I enters the tank through the window N, passes through the body of liquid T, and leaves the tank through the window O. It will be seen that the liquid tank M has considerable depth and that the windows are located in the upper portions of the respective end walls of the tank.

A film gate L is supported from the housing A and extends vertically downward into tank M adjacent the window O. The film gate L has substantial vertical length, is adapted to guide the film strip D in an upward sliding movement, and has an opening in its upper end portion which is aligned with the windows N and O, all as more particularly described subsequently herein in conjunction with FIGURES 8–12, inclusive.

Referring now to FIGURE 3 it will be seen that the tank M has considerable width, and more specifically, over twice the width of the film strip D. Windows N and O are located in respective end walls 20 and 21 in close proximity to one side wall 22 but spaced a considerable distance away from the other side wall 23. A roller 25 is carried on the exterior surface of end wall 20 adjacent the side wall 23, and the film strip D after leaving the supply reel B passes upward over the roller 25 and thence into the first drive unit E from which it is fed downwardly into the liquid tank M. Drive unit E is a toothed sprocket drive of a conventional type. As seen in FIGURE 3 the drive unit E does not lower the film strip down into the path of the light beam I, but rather, lowers it into the body of liquid T beside the path of the light beam.

The film strip D forms a somewhat slack, slightly twisted loop in the lower portion of the liquid tank M, and enters the lower end of film gate L in vertical sliding relationship therewith. Drive unit F is located directly above the film gate L and continuously pulls the film strip vertically upward through the film gate. Drive unit F is also of a conventional toothed sprocket type. In order to maintain the desired amount of slack in the film strip in the lower portion of the tank M it is necessary to synchronize the action of the two drive units, which is done by conventional means, not shown.

The film strip is wet upon leaving the film gate L and must be dried before being rewound upon the takeup reel C. A dryer G of a conventional type is mounted above the housing A, and the film strip passes through it before reaching the takeup reel C.

Tank M is provided with a fluid outlet P and a fluid inlet Q which are coupled together by a recirculation line R. A pump 30, filter 31, and artificial cooling unit 32 are coupled in series in the recirculation line R. Thus the body of liquid T is continuously recirculated, filtered and cooled.

In assembling the apparatus of FIGURE 1 the tank M is first completely detached from the housing A. Film strip D is threaded through the drive units E and F and through the film gate L, and is adjusted to provide the desired amount of slack in the twisted loop. Tank M is filled with the liquid T, is brought underneath the housing A, and is then moved vertically upward and attached to the housing A. To facilitate this process housing A is provided with attachment means K, tank M is provided with separate attachment means S, and the attachment means K and S are designed to move vertically relative to each other until a desired position of the tank is achieved, when a locking action takes place.

Figure 5:
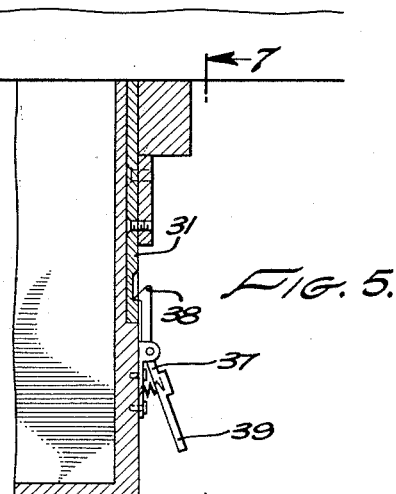
FIGURE 5 is a vertical cross-sectional view taken on the line 5—5 of FIGURE 1, showing the interlocked position of the attachment means.
Figure 4:
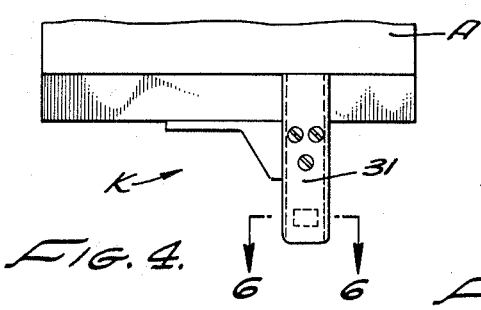
FIGURE 4 is a side view of the attachment means associated with the housing of FIGURE 1.
Figure 6:
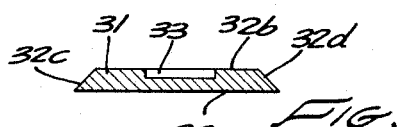
FIGURE 6 is a horizontal cross-sectional view taken on the line 6—6 of FIGURE 4.

Reference is now made to FIGURES 3 through 8, inclusive, which illustrate the structure and function of the attachment means K and S. As seen in FIGURE 3 the side wall 22 of tank M has a vertically extending groove 30 in its exterior surface. The groove 30 is relatively wide and shallow, and has recessed vertical edges. The groove 30 is the main operative portion of the attachment means S of the tank M. As best seen in FIGURES 4 and 6 the principal element of the attachment means K is a flat bar 31 which depends vertically downwardly from the housing A. Bar 31 is of trapezoidal cross-section and is adapted to slidingly engage the groove 30 of tank M. With reference to FIGURE 6 where the trapezoidal cross-section of bar 31 is illustrated, it will be seen that the wide flat side 32a of the bar engages the bottom of groove 30 while its narrow flat side 32b is outwardly disposed, and its flat but inwardly tapered edge surfaces 32c and 32d engage respective recessed edges of the groove 30. Bar 31 near its lower end also has rectangular shallow recess 33 formed in the outer wall surface 32b.

Figure 8:
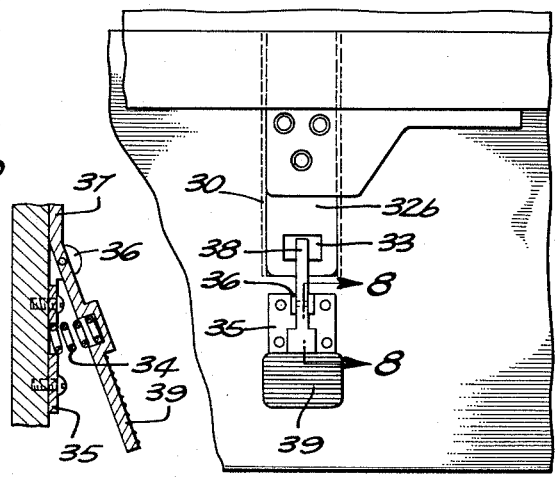
FIGURE 8 is a vertical cross-sectional view taken on the line 8—8 of FIGURE 7.

Attachment means S of the tank M further comprises locking means including a latch plate 35 fastened to the outer surface of wall 22 below and in alignment with the groove 30, and having a pair of pivot ears 36 formed integrally therewith. This arrangement is illustrated in FIGURES 7, 8 and 5. A latch arm 37 is pivotally carried between the pivot ears 36 and has an integrally formed latch 38 at its upper end as well as an integrally formed manual release plate 39 at its lower end. A short helical spring 34 has one end received by the latch plate 35 while its other end is received by the latch arm 37 below the pivot ears 36. Latch 38 extends a short distance above the lower end of groove 30, and when tank M is moved all the way to its upper position (as shown in FIGURES 5 and 7) the bottom end of bar 31 engages with the bottom end of groove 30 and latch 38 then slips into the recess 33. When desired to remove the tank M the manual release plate 39 is depressed, which lifts and disengages the latch 38, thus permitting the tank to slide vertically downward.

As seen in FIGURES 1 and 3 the end wall 21 of tank M has an opening 42 formed therein at the elevation of light beam I. An end wall extension 43 is attached to the exterior surface of wall 21, and carries the window O in parallel relationship both with end wall 21 and the window N. The purpose of opening 42 and end wall extension 43 is to permit an adequate volume of liquid to criculate about the film strip D in the path of light beam I, since in the particular embodiment shown the film gate L is located rather closely to the end wall 21. The parts of the structure may, if desired, be rearranged so that the film gate is further away from the end wall 21, and in that event the window O is formed directly in the end wall 21, without the need for any wall extension.

Reference is now made to FIGURES 9 through 12 which illustrate the structure and operation of the film gate L. A trough-shaped member 45 is disposed in a vertically extending position with the upper end thereof being supported from housing A as indicated generally in FIGURE 1. The trough bottom wall 46 is parallel to and adjacent the end wall 21 of tank M, while the side walls 47 and 48 of the member 45 face toward the center of the liquid tank. The side walls have respective longitudinal shoulders 49, 50 formed on their inner edges for receiving and guiding the film strip D in a vertical sliding movement. At its upper end the member 45 has a rectangular opening 52 formed in its bottom wall 46 for permitting the light beam I to pass therethrough. The vertical height of opening 52 is sufficient to easily accommodate a single frame of the film strip D, and the entire length of member 45 is made substantially greater than the opening so that the vertical sliding movement of the film strip is stabilized prior to the point where the film strip enters the path of the light beam.

Gate L also includes a lid member 55 which engages the tops of side walls 47, 48 in the upper end portion of member 45 so as to retain film strip D securely in place upon the shoulders 49, 50. Lid member 55 has an opening 52' formed therein which is of the same size and is also normally aligned with the opening 52.

Figure 9:
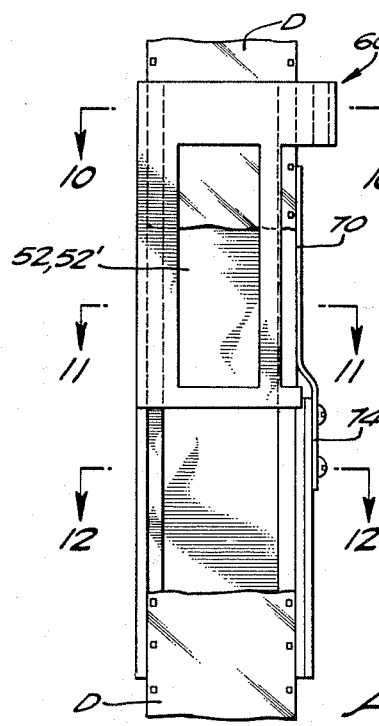
FIGURE 9 is an elevational view of the film gate of FIGURE 1.
Figures 10, 11, 12:
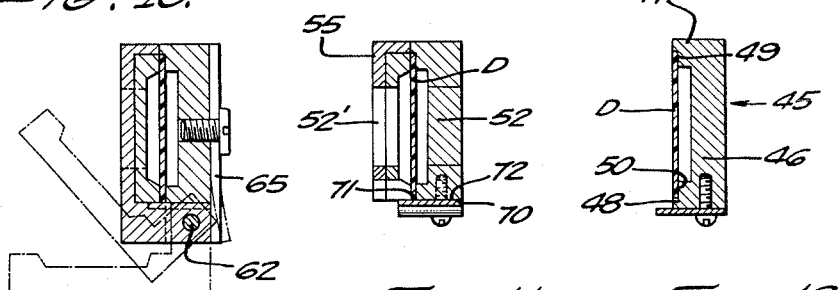
FIGURES 10, 11 and 12 are horizontal cross-sectional views of the upper, middle, and lower portions of the film gate as indicated by the respective section lines of FIGURE 9.

As best seen in FIGURE 9, a hinge 60 is provided above the level of the windows 52, 52'. The hinge includes integrally formed, projecting portions of members 45 and 55 which are pivotally fastened together by a vertical pivot pin 62 (FIGURE 10). As seen in FIGURE 3 the hinge 60 is located on that vertical edge of the gate L which is furthest from side wall 22 of tank M. Thus when the film strip D is initially threaded into the member 45 the lid member 55 is pivoted to an open position near the center of the housing A. When the lid member 55 is swung to its closed position it is held securely in place by a spring latch member 65 carried on the back side of the trough bottom 46. (See FIGURE 10.)

A significant feature of the gate L is that the film strip D is held in a precisely correct position so as to insure good focus of the picture being projected. A further significant feature is the inclusion of a retaining spring 70 in the form of a flat metal strip which frictionally engages one longitudinal side edge of the film strip D as it passes through the path of the light beam. As seen in FIGURES 9 and 11 the side wall 48 of trough shaped member 45 is cut away throughout a vertical distance extending both above and below the openings 52, 52'. Throughout this distance the spring 70 bears against the edge 71 of the film strip and the associated outer wall surface 72 of the narrowed portion of side wall 48. As shown in FIGURE 9 the spring 70 extends vertically of the gate and has its lower end 74 rigidly fastened to the full-width portion of the side wall 48. Spring 70 is necessary in order to control the vertical sliding action of film strip D. It ordinarily retains the film strip in a fixed position but permits it to slide upward a step at a time when pulled by the drive means F.

An important advantage of the present invention is the cooling action provided by the liquid body T. Overheating and warping of the film strip are prevented, thus permitting extensive re-use of the film without loss of focus. Recirculation of the liquid could, however, interfere with the desired optical characteristics, particularly if air bubbles were permitted to enter into the liquid or if excessive turbulence were developed by the recirculation system.

Referring to FIGURE 1 it will be seen that the inlet means Q includes an elongated tube 80 extending upward into tank M adjacent the end wall 20. Tube 80 is capped at its upper end, is coupled to the recirculation line R at its lower end, and has a large number of openings 81 spaced both circumferentially and longitudinally on its surface. The numerous openings 81 diffuse the flow of incoming liquid so as to avoid any turbulent action thereof. Furthermore, the tube 80 is located as far away as conveniently possible from the gate L, since the specific point where turbulence must be avoided is in the region of the gate and its openings 52, 52'. Thus in the path of the light beam the film strip D has both of its surfaces in direct contact with the liquid body, and the continuous cooling of the liquid keeps the film cool and hence unwarped, but at the same time the recirculation of the liquid is controlled in such a manner as to avoid optical defects resulting from liquid turbulence.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:
1. A motion picture projector comprising, in combination:
a film drive housing having vertical end walls and an open bottom;
first and second toothed sprocket drives attached to the interiors of respective ones of said end walls, said first and second toothed sprocket drives being adapted for synchronous operation, said first toothed sprocket drive being operable for continuously lowering a film strip at about the longitudinal center of said housing, said second toothed sprocket drive being operable for continuously pulling the film strip upward at the associated end of said housing;
a film gate disposed beneath said second toothed sprocket drive and supported from the associated end wall of said housing, said film gate extending downwardly below said open bottom of said housing and including guide means for guiding the film strip vertically upward to said second toothed sprocket drive;
attachment means carried by at least one wall of said housing;
an open-topped tank having first and second end walls adapted to engage the lower edges of respective end walls of said housing, said first and second end walls having first and second windows respectively formed in the upper portions thereof, said windows being disposed substantially parallel to each other in horizontal alignment;
additional attachment means carried by at least one wall of said tank, and co-operable with said attachment means of said housing in vertically slidable relationship therewith;
latch means for locking said tank beneath said housing in engagement therewith;
a body of liquid, having an index of refraction approximately the same as that of a film to be projected, which fills said tank up to and above said windows;
a light source, supported from said housing, disposed externally to said tank adjacent to said first window and generating a light beam which enters said tank through said first window, passes through said body of liquid within said tank, and leaves said tank through said second window;
said film gate having an aperture which is aligned with said windows when said tank is in its locked position, and being adapted to support the film strip in said aperture with both surfaces thereof in direct contact with said body of liquid;
said tank being at least twice as wide as the film strip and said first toothed sprocket drive being laterally offset relative to said first window so that the film strip is lowered into said body of liquid beside said light beam in a slack, slightly twisted loop;
fluid outlet means formed in the central portion of the bottom of said tank;
fluid inlet means formed in the end of the bottom of said tank adjacent said first end wall, and including means for dispersing the incoming fluid;
and fluid recirculating means intercoupling said fluid outlet means and fluid inlet means;
the operation being such that the film strip may be threaded into said first and second toothed sprocket drives and said film gate, said tank may separately be filled with said body of liquid, and said tank may thereafter be attached to said housing and locked in place so as to immerse the film strip and said gate aperture in said body of liquid without disturbing the position of the film strip.
2. A projector as claimed in claim 1 wherein said first end wall has a portion of its upper edge, laterally displaced from said first window, cut out to permit the film strip to enter between said tank and said housing and pass upwardly over said first toothed sprocket drive, and which further includes a roller attached to the exterior of said first end wall beneath said cut out portion for supporting the film strip.

3. A projector as claimed in claim 1 wherein said fluid inlet means includes a vertically extending tube having a capped upper end, and having a plurality of perforations formed at both circumferentially spaced and vertically spaced locations in its exterior wall.

4. A projector as claimed in claim 1 wherein said second end wall has an outwardly offset portion adjacent said gate aperture, said second window being disposed in said outwardly offset portion, whereby a substantial volume of liquid circulates on the side of the film strip facing said second end wall in the region of said light beam.

References Cited by the Examiner
UNITED STATES PATENTS

| | | | |
|---|---|---|---|
| 936,031 | 10/09 | Pink | 242—101 |
| 2,073,287 | 3/37 | Sandvik | 352—5 |
| 2,175,343 | 10/39 | Cunningham et al. | 88—24 |
| 2,427,327 | 9/47 | Nemeth | 352—224 |
| 2,834,273 | 5/58 | Bartilotta | 88—24 |
| 2,890,621 | 6/59 | Suits | 88—24 |
| 3,052,157 | 9/62 | Debrie | 352—130 |

NORTON ANSHER, *Primary Examiner.*
EMIL G. ANDERSON, *Examiner.*